US012113648B2

(12) United States Patent
Tsuchiya

(10) Patent No.: US 12,113,648 B2
(45) Date of Patent: Oct. 8, 2024

(54) INFORMATION PROCESSING APPARATUS, INFORMATION PROCESSING METHOD, AND PROGRAM

(71) Applicant: Yokogawa Electric Corporation, Musashino (JP)

(72) Inventor: Masanobu Tsuchiya, Musashino (JP)

(73) Assignee: YOKOGAWA ELECTRIC CORPORATION, Musashino (JP)

( * ) Notice: Subject to any disclaimer, the term of this patent is extended or adjusted under 35 U.S.C. 154(b) by 0 days.

(21) Appl. No.: 18/186,913

(22) Filed: Mar. 20, 2023

(65) Prior Publication Data

US 2023/0318876 A1 Oct. 5, 2023

(30) Foreign Application Priority Data

Mar. 31, 2022 (JP) .................................. 2022-061308

(51) Int. Cl.
*H04L 12/46* (2006.01)
(52) U.S. Cl.
CPC ................................ *H04L 12/4641* (2013.01)
(58) Field of Classification Search
CPC .......................................... H04L 12/4641
USPC ...................................................... 709/223
See application file for complete search history.

(56) References Cited

U.S. PATENT DOCUMENTS

| 7,373,394 | B1 | 5/2008 | Li et al. | |
|---|---|---|---|---|
| 8,644,188 | B1 * | 2/2014 | Brandwine | H04L 45/00 370/254 |
| 8,918,488 | B2 * | 12/2014 | Umbehocker | G06F 9/5011 709/215 |
| 8,966,035 | B2 * | 2/2015 | Casado | H04L 45/54 718/1 |
| 9,021,009 | B2 * | 4/2015 | Van Biljon | H04M 15/66 709/201 |

(Continued)

FOREIGN PATENT DOCUMENTS

| CN | 111385673 A | * | 7/2020 | ......... H04L 65/1069 |
|---|---|---|---|---|
| CN | 109526249 B | * | 4/2021 | ............... G06F 9/54 |

(Continued)

OTHER PUBLICATIONS

Hua Shao et al., "Accessing Cloud with Disaggregated Software-Defined Router", USENIX Association, Apr. 12, 2021, pp. 10-23, cited in EP Extended European Search Report dated Aug. 28, 2023. (14 pages).

*Primary Examiner* — Melvin H Pollack
(74) *Attorney, Agent, or Firm* — WHDA, LLP

(57) ABSTRACT

A first information processing apparatus (10) according to the present disclosure includes a control communication unit configured to transmit and receive control communication information according to a control communication protocol, and an adaptor configured to generate first control communication information of a first communication method for one-to-many communication from among the control communication information required for control communication based on the control communication protocol, the adaptor generating the first control communication information with use of information acquired along a path different from a communication path of the control communication on a network in a cloud, and to output the first control communication information to the control communication unit.

10 Claims, 6 Drawing Sheets

(56) References Cited

U.S. PATENT DOCUMENTS

| | | | | |
|---|---|---|---|---|
| 11,025,452 | B2* | 6/2021 | Krikorian | H04L 67/564 |
| 11,281,499 | B2* | 3/2022 | Bartfai-Walcott | H04L 67/10 |
| 11,509,494 | B2* | 11/2022 | Mishra | H04L 45/50 |
| 11,546,432 | B2* | 1/2023 | Mammen | H04L 61/251 |
| 11,659,023 | B2* | 5/2023 | Shelton, IV | A61B 34/25 |
| | | | | 709/227 |
| 11,663,047 | B2* | 5/2023 | Bartfai-Walcott | G06F 9/5061 |
| | | | | 709/223 |
| 11,669,488 | B2* | 6/2023 | Thakkar | H04L 41/20 |
| | | | | 709/226 |
| 11,743,141 | B2* | 8/2023 | Natal | H04L 41/5019 |
| | | | | 709/223 |
| 11,774,944 | B2* | 10/2023 | Cella | G06N 20/00 |
| | | | | 700/275 |
| 11,792,090 | B2* | 10/2023 | Mladin | H04L 41/5054 |
| | | | | 709/224 |
| 2013/0151685 | A1* | 6/2013 | Bursell | G06F 9/45558 |
| | | | | 709/223 |
| 2014/0122675 | A1* | 5/2014 | Cohen | H04L 12/413 |
| | | | | 709/223 |
| 2016/0080285 | A1* | 3/2016 | Ramachandran | H04L 41/0668 |
| | | | | 709/223 |
| 2022/0360465 | A1* | 11/2022 | Holmberg | H04L 12/1868 |
| 2023/0019024 | A1* | 1/2023 | Stare | H04W 72/30 |
| 2023/0163893 | A1* | 5/2023 | Shokri Razaghi | H04L 1/1854 |
| | | | | 370/329 |
| 2023/0261898 | A1* | 8/2023 | Natori | H04L 12/4013 |
| | | | | 370/465 |
| 2023/0319606 | A1* | 10/2023 | Bergström | H04W 24/08 |
| | | | | 455/67.11 |
| 2023/0388054 | A1* | 11/2023 | Wang | H04L 5/0055 |
| 2023/0422095 | A1* | 12/2023 | Eker | H04L 41/0806 |

FOREIGN PATENT DOCUMENTS

| | | | | |
|---|---|---|---|---|
| JP | 5679343 | B2 | 3/2015 | |
| JP | 6776572 | B2 * | 10/2020 | H04L 12/46 |
| WO | 2019/045993 | A1 | 3/2019 | |
| WO | 2021/074668 | A1 | 4/2021 | |

* cited by examiner

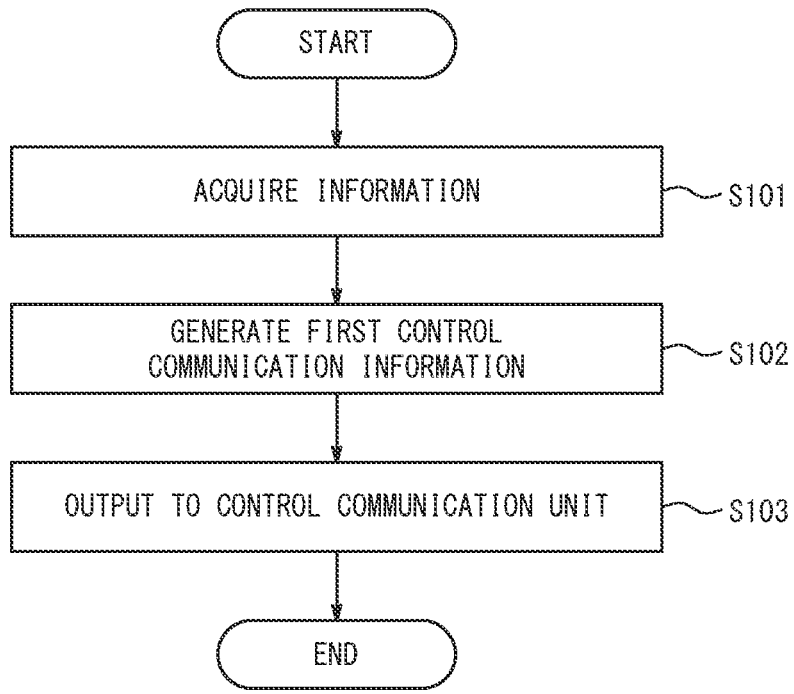
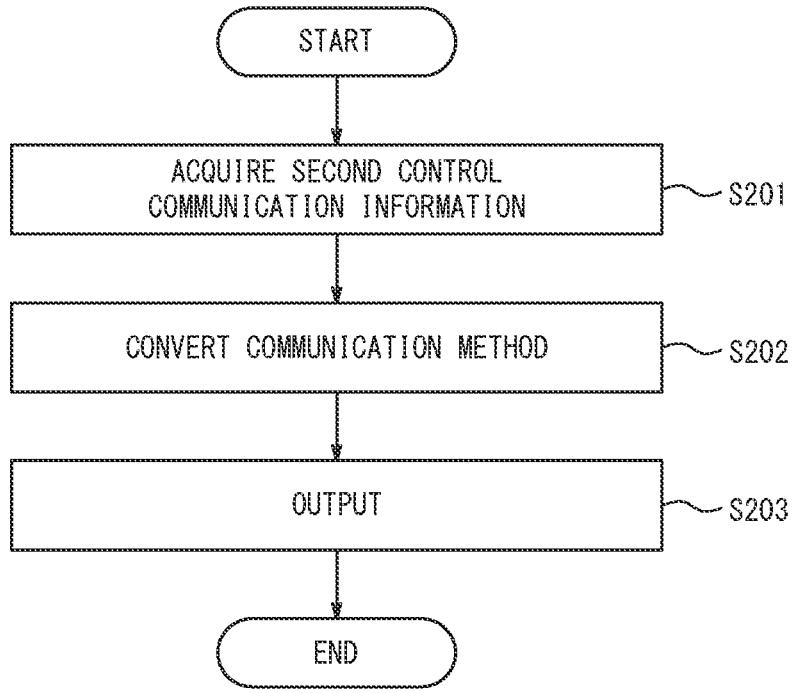

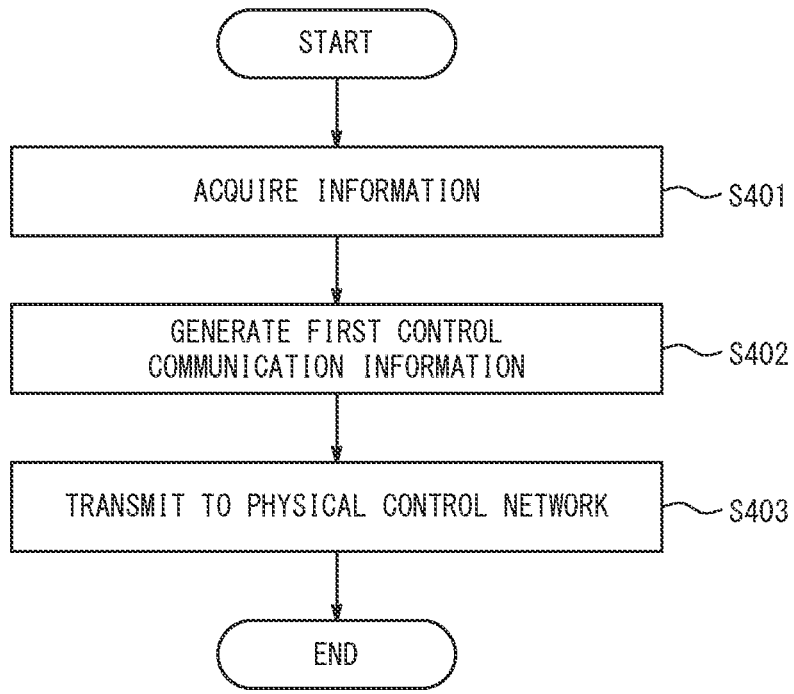
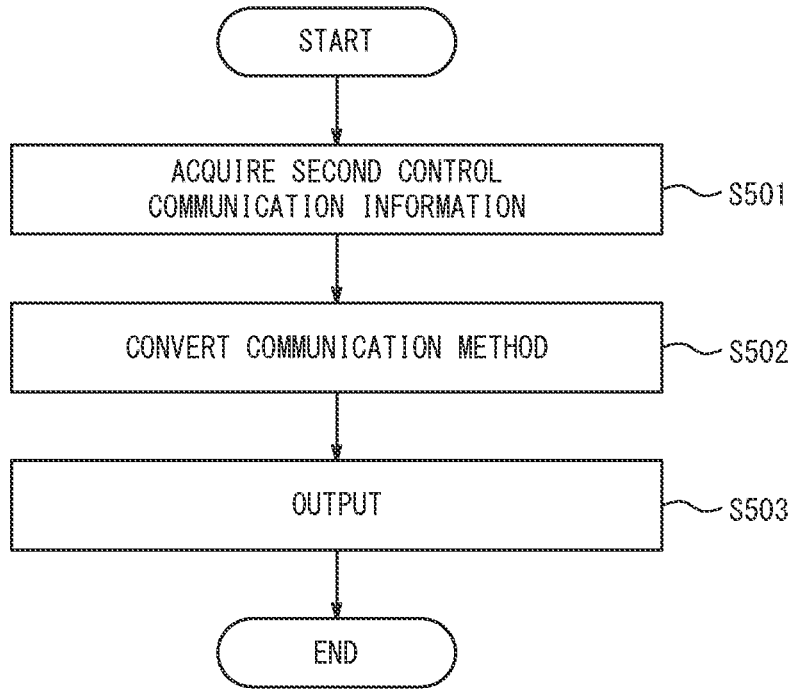

INFORMATION PROCESSING APPARATUS, INFORMATION PROCESSING METHOD, AND PROGRAM

CROSS-REFERENCE TO RELATED APPLICATION

The present application claims priority to Japanese Patent Application No. 2022-061308 filed on Mar. 31, 2022, the entire contents of which are incorporated herein by reference.

TECHNICAL FIELD

The present disclosure relates to an information processing apparatus, an information processing method, and a program.

BACKGROUND

Technology using a network in the cloud is known. For example, Patent Literature (PTL) 1 discloses a cloud system that connects a plurality of cloud locations by interconnecting the locations via a Virtual Private Network (VPN). Such a cloud system can help to avoid the depletion of Virtual Local Area Network (VLAN)-IDs.

In conventional process control systems using physical equipment, control communication is performed using physical communication cables. Such a process control system could be operated on a network in the cloud.

CITATION LIST

Patent Literature

PTL 1: JP 5679343 B2

SUMMARY

An information processing apparatus according to several embodiments includes a control communication unit configured to transmit and receive control communication information according to a control communication protocol, and an adaptor configured to generate first control communication information of a first communication method for one-to-many communication from among the control communication information required for control communication based on the control communication protocol, the adaptor generating the first control communication information with use of information acquired along a path different from a communication path of the control communication on a network in a cloud, and to output the first control communication information to the control communication unit.

BRIEF DESCRIPTION OF THE DRAWINGS

In the accompanying drawings:

FIG. 2 is a flowchart for explaining a first example of a first information processing method executed by a first information processing apparatus in FIG. 1;

FIG. 3 is a flowchart for explaining a second example of the first information processing method executed by the first information processing apparatus in FIG. 1;

FIG. 7 is a flowchart for explaining a first example of a second information processing method executed by a second information processing apparatus in FIG. 6; and FIG. 8 is a flowchart for explaining a second example of the second information processing method executed by the second information processing apparatus in FIG. 6.

DETAILED DESCRIPTION

Figure 1:
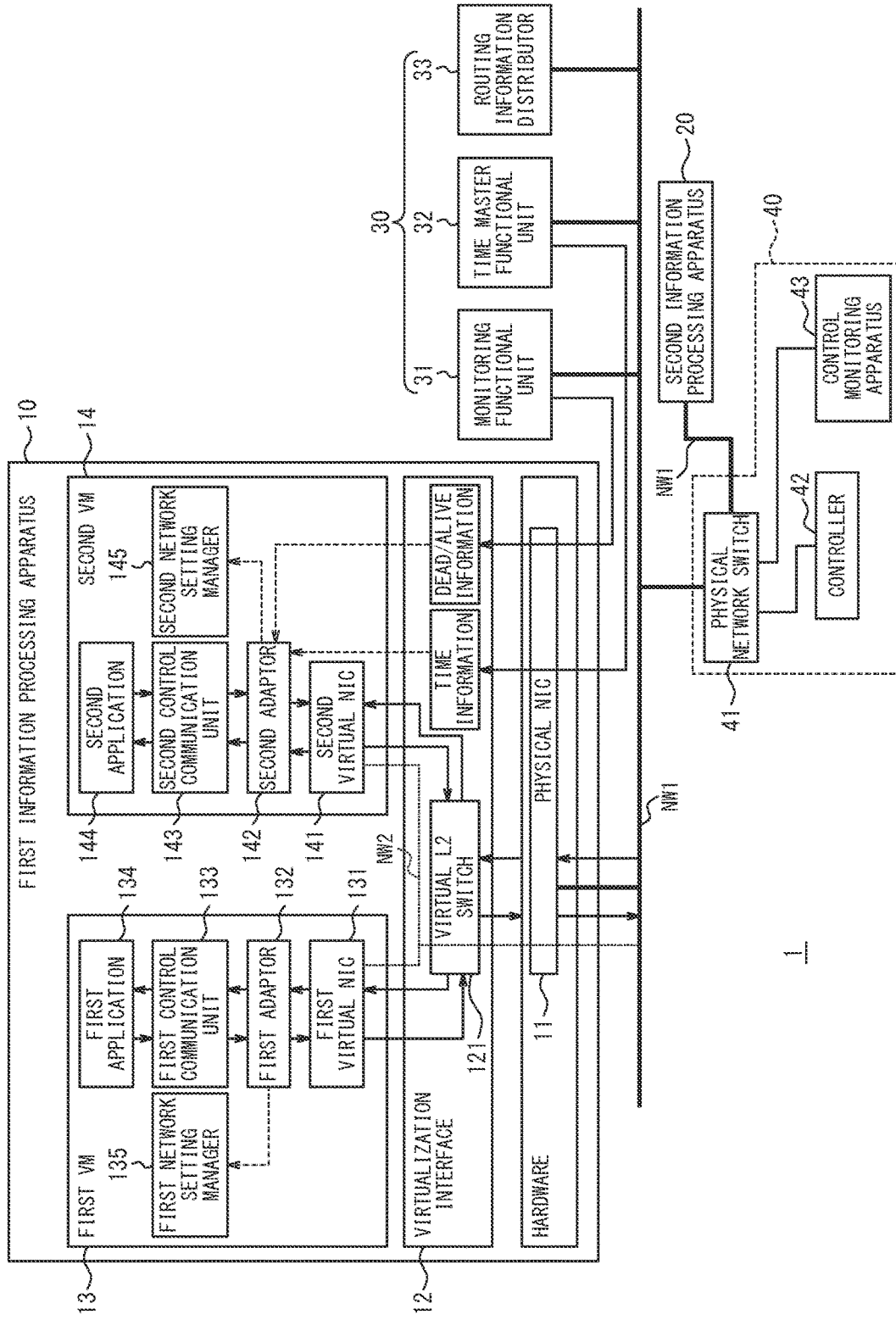
FIG. 1 is a block diagram illustrating an example configuration of a control communication system according to an embodiment of the present disclosure.

Networks in the cloud generally do not support one-to-many communication methods, including multicast and broadcast. Such communication methods are, however, used for control communication. Therefore, it has been difficult to use control communication protocols with networks in the cloud.

It would be helpful to provide an information processing apparatus, an information processing method, and a program that can achieve control communication on a network in the cloud.

An information processing apparatus according to several embodiments includes a control communication unit configured to transmit and receive control communication information according to a control communication protocol, and an adaptor configured to generate first control communication information of a first communication method for one-to-many communication from among the control communication information required for control communication based on the control communication protocol, the adaptor generating the first control communication information with use of information acquired along a path different from a communication path of the control communication on a network in a cloud, and to output the first control communication information to the control communication unit.

This enables control communication on a network in the cloud. The information processing apparatus generates the first control communication information of the first communication method using information acquired along a path different from the communication path of the control communication in the network on the cloud. Therefore, the information processing apparatus can achieve the functions necessary for control communication without having the first control communication information of the first communication method, which includes multicast, broadcast, and the like that are not supported by the network in the cloud, go through the communication path of control communication on the network. The information processing apparatus enables communication by the control communication protocol even on a network in the cloud in which multicast and broadcast cannot be used.

In an embodiment, the information processing apparatus may include a virtualization interface, and the control communication unit and the adaptor may function on a virtual machine constructed by the virtualization interface. This enables the information processing apparatus to achieve control communication on the virtual machine constructed by the virtualization interface. The information processing apparatus can also construct and activate a plurality of virtual machines on a single physical server.

In an embodiment, the adaptor may be configured to generate the first control communication information with use of the information aggregated in the virtualization interface. In this way, the information processing apparatus can output the first control communication information to the control communication unit based on information acquired via the virtualization interface from the outside, such as a network environment manager. In other words, the information processing apparatus can achieve the functions necessary for control communication using a path different from the communication path of control communication on the network in the cloud.

In an embodiment, the adaptor may be configured to refrain from transmitting the first control communication information of the first communication method acquired from the control communication unit to the outside. This enables the information processing apparatus to reduce the communication volume on the network in the cloud.

In an embodiment, for second control communication information of the first communication method, the adaptor may be configured to convert a communication method between a second communication method for one-to-one communication and the first communication method. This enables the information processing apparatus to transmit and receive the second control communication information via the second communication method on a network in the cloud in which the first communication method is not supported.

In an embodiment, the adaptor may be configured to transmit and receive the second control communication information between the control communication unit and the outside along the communication path or the path. This enables the information processing apparatus to exchange the second control communication information with an external node.

In an embodiment, the adaptor may be configured to transmit and receive, along the communication path, third control communication information of a second communication method for one-to-one communication. This enables the information processing apparatus to achieve normal control communication according to the control communication protocol.

In an embodiment, the information processing apparatus may further include a network setting manager, and the adaptor may be configured to generate network setting information based on the acquired first control communication information and set the network setting information in the network setting manager. This enables the information processing apparatus to manage routing information from the first control communication information generated in the adaptor.

An information processing method according to several embodiments is an information processing method to be executed by an information processing apparatus, the information processing method including generating first control communication information of a first communication method for one-to-many communication from among control communication information required for control communication based on a control communication protocol, the first control communication information being generated with use of information acquired along a path different from a communication path of the control communication on a network in a cloud; and transmitting and receiving the control communication information according to the control communication protocol.

This enables control communication on a network in the cloud. The information processing apparatus generates the first control communication information of the first communication method using information acquired along a path different from the communication path of the control communication in the network on the cloud. Therefore, the information processing apparatus can achieve the functions necessary for control communication without having the first control communication information of the first communication method, which includes multicast, broadcast, and the like that are not supported by the network in the cloud, go through the communication path of control communication on the network. The information processing apparatus enables communication by the control communication protocol even on a network in the cloud in which multicast and broadcast cannot be used.

A program according to several embodiments is configured to cause an information processing apparatus to execute operations including: generating first control communication information of a first communication method for one-to-many communication from among control communication information required for control communication based on a control communication protocol, the first control communication information being generated with use of information acquired along a path different from a communication path of the control communication on a network in a cloud; and transmitting and receiving the control communication information according to the control communication protocol.

This enables control communication on a network in the cloud. The information processing apparatus generates the first control communication information of the first communication method using information acquired along a path different from the communication path of the control communication in the network on the cloud. Therefore, the information processing apparatus can achieve the functions necessary for control communication without having the first control communication information of the first communication method, which includes multicast, broadcast, and the like that are not supported by the network in the cloud, go through the communication path of control communication on the network. The information processing apparatus enables communication by the control communication protocol even on a network in the cloud in which multicast and broadcast cannot be used.

According to the present disclosure, an information processing apparatus, an information processing method, and a program that can achieve control communication on a network in the cloud can be provided.

The background and problems with conventional technology are described in greater detail.

In conventional process control systems using physical equipment, control communication is performed using physical communication cables. For example, when a process control system is operated in a virtual environment in the cloud, the processing of each control device is realized on a virtual machine (VM), and communication between VMs is performed by connecting each VM to a virtual control network.

In control communication, multicast is used for the purpose of transmitting data simultaneously to a plurality of devices by one-to-specified number communication on the network. Similarly, in control communication, broadcast is used for the purpose of transmitting data simultaneously to a plurality of devices by one-to-unspecified number communication on the network, without limiting the communication destination.

Examples of control communication information using multicast include time synchronization information, diagnostic information, and alarm information.

Time synchronization information is transmitted by the node that is the master of time synchronization to all nodes belonging to a defined time group. Each node receives the same time information at approximately the same timing. Therefore, by taking into account routing delays on the network, the nodes on the network are set to the same time. There may be multiple master and time group pairs.

The diagnostic information corresponds to dead/alive monitoring information for a node. The diagnostic information is transmitted by each node at regular intervals to a defined range of nodes, including, for example, all nodes in the same subnet and specific nodes in another subnet. By receiving the diagnostic information, each node identifies that the source node of transmission is connected to the network and operating, and that the source node is aware of whether each node itself is operating.

The alarm information is transmitted to all nodes to notify other nodes of an anomaly that has occurred on a node.

An example of control communication information using broadcast is routing information. Routing information is used by each node to communicate with another Internet Protocol (IP) network segment and is delivered by an L3 switch.

However, networks in the cloud generally do not support multicast and broadcast. Therefore, it has been difficult to use control communication protocols with networks in the cloud.

To resolve such a problem, it would be helpful to provide an information processing apparatus, an information processing method, and a program that can achieve control communication on a network in the cloud. Embodiments of the present disclosure are mainly described below with reference to the drawings.

(Control Communication System)

FIG. 1 is a block diagram illustrating an example configuration of a control communication system 1 according to an embodiment of the present disclosure. FIG. 1 focuses mainly on the configuration of a first information processing apparatus 10, described below, and illustrates the configuration of the first information processing apparatus 10 in detail.

The control communication system 1 includes the first information processing apparatus 10, a second information processing apparatus 20, a network environment manager 30, and a physical control network 40. The first information processing apparatus 10, the second information processing apparatus 20, the network environment manager 30, and the physical control network 40 are communicably connected to each other via a network NW1.

The first information processing apparatus 10 is one physical server or a plurality of physical servers that can communicate with each other. In FIG. 1, the first information processing apparatus 10 is illustrated as one physical server as an example for the sake of explanation. The first information processing apparatus 10 is not limited to these examples and may be any general purpose electronic device, such as a PC or smartphone, or another electronic device dedicated to the control communication system 1.

The second information processing apparatus 20 is one physical server or a plurality of physical servers that can communicate with each other. In FIG. 1, the second information processing apparatus 20 is illustrated as one physical server as an example for the sake of explanation. The second information processing apparatus 20 is not limited to these examples and may be any general purpose electronic device, such as a PC or smartphone, or another electronic device dedicated to the control communication system 1.

The network environment manager 30 manages the network environment of the entire network NW1. The network environment manager 30 includes a monitoring functional unit 31, a time master functional unit 32, and a routing information distributor 33.

The monitoring functional unit 31 includes, for example, a Network Management System (NMS), The monitoring functional unit 31 monitors the network NW1 and provides functions such as dead/alive monitoring, traffic obstacle and error detection, security maintenance, performance management, and report generation for each apparatus communicably connected to the network NW1.

The time master functional unit 32 includes, for example, an NTP (Network Time Protocol) server. The time master functional unit 32 provides the function of acquiring and distributing correct time information.

The routing information distributor 33 includes, for example, a server that processes routing information. The routing information distributor 33 provides a function to manage routing information for the entire network NW1.

The physical control network 40 includes a physical network switch 41, a controller 42, and a control monitoring apparatus 43 as a human machine interface (HMI). The controller 42 and the control monitoring apparatus 43 are communicably connected to the network NW1 via the physical network switch 41. The physical control network 40 is communicably connected to the first information processing apparatus 10, the second information processing apparatus 20, and the network environment manager 30 on the network NW1 via the physical network switch 41. The physical network switch 41 connects the second information processing apparatus 20 along with the network in the cloud, described below, and the physical control network 40.

(First Information Processing Apparatus)

The configuration and functions of the first information processing apparatus 10 are mainly described below with reference to FIG. 1.

The first information processing apparatus 10 includes a physical Network Interface Card (NIC) 11 as hardware. The first information processing apparatus 10 is communicably connected to the network NW1 via the physical NIC 11.

The first information processing apparatus 10 includes a virtualization interface 12. The virtualization interface 12 provides functions as a hypervisor. The virtualization interface 12 constructs a virtual environment in the first information processing apparatus 10. The virtualization interface 12 constructs at least one VM in the first information processing apparatus 10. As an example in FIG. 1, the virtualization interface 12 constructs two VMs, a first VM 13 and a second VM 14, in the first information processing apparatus 10.

The first VM 13 and the second VM 14 are connected to each other on a virtual control network NW2 through the virtual L2 switch 121 on the virtualization interface 12. The first VM 13 and the second VM 14 are under the network environment in the cloud.

The first VM 13 is communicably connected to the virtual control network NW1 via a first virtual NIC 131. The first VM 13 includes a first adaptor 132, a first control communication unit 133, and a first application 134. The first adaptor 132, the first control communication unit 133, and the first application 134 function on the first VM 13 as a virtual machine constructed by the virtualization interface 12 of the first information processing apparatus 10.

The information transmitted on the virtual control network NW2 is received by the first control communication unit 133 through the first virtual NIC 131 and the first adaptor 132, in that order. The information outputted from the first control communication unit 133 is transmitted to the virtual control network NW2 via the first adaptor 132 and the first virtual NIC 131, in that order. The first control communication unit 133 is functionally connected to the first application 134.

The second VM 14 is communicably connected to the virtual control network NW2 via a second virtual MC 141. The second VM 14 includes a second adaptor 142, a second control communication unit 143, and a second application 144. The second adaptor 142, the second control communication unit 143, and the second application 144 function on the second VM 14 as a virtual machine constructed by the virtualization interface 12 of the first information processing apparatus 10.

The information transmitted on the virtual control network NW2 is received by the second control communication unit 143 through the second virtual NIC 141 and the second adaptor 142, in that order. The information outputted from the second control communication unit 143 is transmitted to the virtual control network NW2 via the second adaptor 142 and the second virtual NIC 141, in that order. The second control communication unit 143 is functionally connected to the second application 144.

In the following, the first control communication unit 133 and the second control communication unit 143 are collectively described as the "control communication unit". The first adaptor 132 and the second adaptor 142 are collectively described as the "adaptor". In FIG. 1, the functions of the control communication unit and adaptor are illustrated with primary focus on the second control communication unit 143 and the second adaptor 142, but the functions of the control communication unit and adaptor in the following description apply to both the first VM 13 and the second VM 14.

The control communication unit transmits and receives control communication information to and from external devices via the adaptor in accordance with the control communication protocol. In this specification, the "control communication information" includes, for example, the time synchronization information, diagnostic information, and alarm information each described above.

The adaptor generates the first control communication information from among the control communication information required for control communication based on the control communication protocol, the adaptor generating the first control communication information with use of information acquired along a path different from the communication path of the control communication on a network in the cloud that includes the first VM 13 and the second VM 14. The first control communication information is information of the first communication method for one-to-many communication, which is not supported by the network in the cloud that includes the first VM 13 and the second VM 14. The adaptor outputs the generated first control communication information to the control communication unit.

In this specification, the "first control communication information" includes, for example, time synchronization information and diagnostic information. The "first communication method" includes, for example, multicast and broadcast.

The adaptor generates the first control communication information using information aggregated in the virtualization interface 12 of the first information processing apparatus 10.

For example, the external time master functional unit 32 is used for time synchronization information. An external time synchronization function such as the time master functional unit 32 is used to set the time of the virtualization interface 12. The virtualization interface 12 can set the time of each of the first VM 13 and the second VM 14. The adaptor acquires the time information from the virtualization interface 12, converts the time information into time synchronization information for control communication, and outputs the result to the control communication unit. In this way, the adaptor generates multicast time synchronization information using the time information acquired from the virtualization interface 12 not along the communication path of control communication on the network in the cloud via the physical NIC 11 and the virtual L2 switch 121, but rather along a path different from that communication path.

For example, for the diagnostic information, an external dead/alive monitoring function, such as the monitoring functional unit 31, is used. The external monitoring functional unit 31 performs dead/alive monitoring of all nodes. The virtualization interface 12 of each first information processing apparatus 10 acquires the dead/alive information from the external monitoring functional unit 31. The adaptor acquires the dead/alive: information from the virtualization interface 12, converts the dead/alive information into diagnostic information as dead/alive monitoring information from each node in control communication, and outputs the result to the control communication unit. In this way, the adaptor generates multicast diagnostic information using the dead/alive information acquired from the virtualization interface 12 not along the communication path of control communication on the network in the cloud via the physical NIC 11 and the virtual L2 switch 121, but rather along a path different from that communication path.

The adaptor does not transmit the first control communication information of the first communication method acquired from the control communication unit to the outside. Since the first communication method is not supported on the communication path of control communication on t network in the cloud via the physical NIC 11 and the virtual L2 switch 121, the adaptor pretends to have transmitted the first control communication information along the communication path without actually transmitting this information to the outside. In other words, the adaptor does not perform a process that returns an error to the control communication unit even if the first control communication information is not transmitted to the outside. Alternatively, the adaptor may output false information to the control communication unit indicating that the first control communication information was transmitted.

For example, the adaptor pretends to transmit time synchronization information for control communication without actually transmitting the information. Since the time acquired externally from the time master functional unit 32, for example, is sufficiently reliable, the adaptor mainly performs a process to use the external time master functional unit 32, via the virtualization interface 12, to generate multicast time synchronization information and output this information to the control communication unit.

For example, the adaptor pretends to transmit diagnostic information for control communication without actually transmitting the information. Since the dead/alive information acquired externally from the monitoring functional unit 31, for example, is sufficiently reliable, the adaptor mainly performs a process to use the external monitoring functional unit 31, via the virtualization interface 12, to generate multicast diagnostic information and output this information to the control communication unit.

For second control communication information of the first communication method, the adaptor converts the communication method between a second communication method for one-to-one communication and the first communication method. The adaptor transmits and receives the second control communication information between the control communication unit and the outside along the communication path of control communication on the network in the cloud via the physical NIC 11 and the virtual L2 switch 121. In this specification, the "second control communication information" includes, for example, alarm information. The "second communication method" includes, for example, unicast.

For example, the adaptor converts the protocol of multicast alarm information, acquired from the control communication unit, to unicast. The adaptor adds information indicating broadcast communication to the multicast communication frame corresponding to the alarm information acquired from the control communication unit, encapsulates the data into unicast for all nodes, and transmits the result. The adaptor may communicate using a VPN capable of performing such conversion.

For example, the adaptor converts the protocol of unicast alarm information, received from the outside along the communication path of control communication on the network in the cloud, to multicast. The adaptor outputs the converted multicast alarm information to the control communication unit as alarm information in the control communication.

The adaptor transmits and receives third control communication information of the second communication method, for one-to-one communication, between the control communication unit and the outside along the communication path of control communication on the network in the cloud. In this specification, the "third control communication information" includes any other control communication information based on unicast, excluding various information based on multicast or broadcast, for example. The adaptor performs data acquisition from devices, for example, as usual based on unicast control communication. Based on unicast communication supported by the network in the cloud, the adaptor can transmit and receive the third control communication information without restriction.

The first VM 13 further includes a first network setting manager 135. The second VM 14 further includes a second network setting manager 145. In the following, the first network setting manager 135 and the second network setting manager 145 are collectively referred to as the "network setting manager".

The adaptor generates network setting information based on the acquired first control communication information and sets the network setting information in the network setting manager. In this specification, the "network setting information" includes, for example, routing information delivered by multicast or broadcast according to a routing protocol. The network setting manager includes routing table information that is updated after receipt of the delivered routing information.

The adaptor uses routing table settings for routing information without using protocols. The routing information is acquired by use of the settings for the routing table on the network setting manager, without use of distribution information for a routing protocol that uses multicast or broadcast.

In the cloud, data is typically routed properly when communicating by the default gateway, even if IP network segments are separated. Therefore, in such cases, it is possible to simply set the default gateway in the routing table on the VM. In a case in which the default gateway alone does not suffice, the adaptor generates diagnostic information and generates routing information based on the diagnostic information. The adaptor sets the generated routing information in the routing table.

Figure 4:
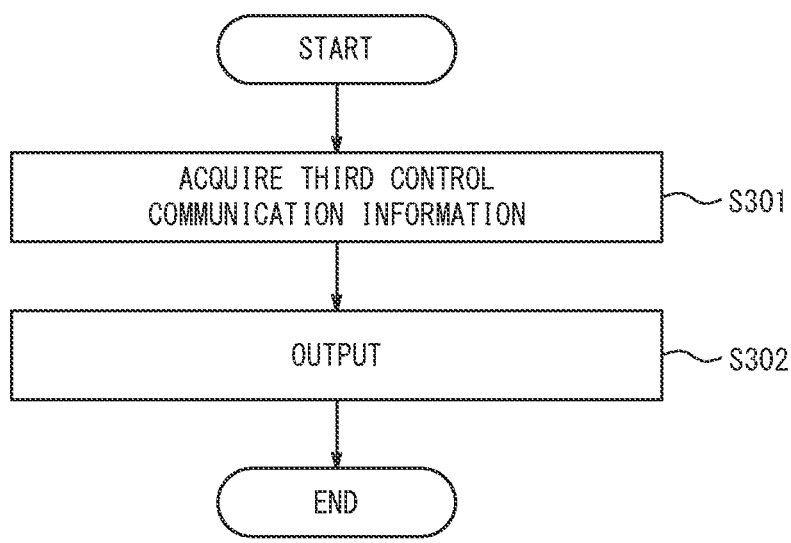
FIG. 4 is a flowchart for explaining a third example of the first information processing method executed by the first information processing apparatus in FIG. 1.

With reference to FIGS. 2 through 4, the flow of processing executed by the adaptor of the first information processing apparatus 10 in FIG. 1 is now mainly described. FIG. 2 is a flowchart for explaining a first example of the first information processing method executed by the first information processing apparatus 10 in FIG. 1.

In step S101, the adaptor of the first information processing apparatus 10 acquires information via the virtualization interface 12 along a path different from the communication path of control communication on the network in the cloud.

In step S102, using the information acquired in step S101, the adaptor generates the first control communication information of the first communication method for one-to-many communication from among the control communication information required for control communication based on the control communication protocol.

In step S103, the adaptor outputs the first control communication information generated in step S102 to the control communication unit that transmits and receives control communication information according to the control communication protocol, FIG. 3 is a flowchart for explaining a second example of the first information processing method executed by the first information processing apparatus 10 in FIG. 1.

In step S201, the adaptor of the first information processing apparatus 10 acquires the second control communication information. For example, the adaptor acquires the multicast alarm information from the control communication unit. For example, the adaptor receives the unicast alarm information from the outside along the communication path of control communication on the network in the cloud.

In step S202, for the second control communication information acquired in step S201, the adaptor converts the communication method between the first communication method and the second communication method. For example, the adaptor converts multicast alarm information, acquired from the control communication unit, to unicast. For example, the adaptor converts unicast alarm information, received from the outside, to multicast.

In step S203, the adaptor outputs the second control communication information for which the communication method was converted in step S202. For example, the adaptor transmits alarm information converted to unicast to the outside along the communication path of control communication on the network in the cloud. For example, the adaptor outputs alarm information converted to multicast to the control communication unit.

FIG. 4 is a flowchart for explaining a third example of the first information processing method executed by the first information processing apparatus 10 in FIG. 1.

In step S301, the adaptor of the first information processing apparatus 10 acquires the third control communication information. For example, the adaptor acquires the unicast third control communication information from the control communication unit. For example, the adaptor receives the unicast third control communication information from the outside along the communication path of control communication on the network in the cloud.

In step S302, the adaptor outputs the third control communication information acquired in step S301. For example, the adaptor transfers the unicast third control communication information as is to the outside along the communication path of control communication on the network in the cloud. For example, the adaptor outputs the unicast third control communication information as is to the control communication unit.

According to the first information processing apparatus 10 and the first information processing method executed by the first information processing apparatus 10 in the above embodiment, control communication can be achieved on a network in the cloud. The first information processing apparatus 10 generates the first control communication information of the first communication method using information acquired along a path different from the communication path of the control communication in the network on the cloud. Therefore, the first information processing apparatus 10 can achieve the functions necessary for control communication without having the first control communication information of the first communication method, which includes multicast, broadcast, and the like that are not supported by the network in the cloud, go through the communication path of control communication on the network. The first information processing apparatus 10 enables communication by the control communication protocol even on a network in the cloud in which multicast and broadcast cannot be used.

The first information processing apparatus 10 can achieve control communication on the network in the cloud without modification to the first application 134 and the second application 144 operating on the network in the cloud or to the control communication unit. The first information processing apparatus 10 can distribute the load for control communication and achieve improved functionality together with the evolution of Information Technology (IT) by substituting some of the functions of the control communication protocol with the functions of IT, including the virtualization interface 12 and the adaptor.

By including the virtualization interface 12, the first information processing apparatus 10 can achieve control communication on a virtual machine constructed by the virtualization interface 12. The first information processing apparatus 10 can also construct and activate a plurality of virtual machines on a single physical server.

By generating the first control communication information using the information aggregated in the virtualization interface 12, the first information processing apparatus 10 can output the first control communication information to the control communication unit based on information acquired from the outside, such as the network environment manager 30, via the virtualization interface 12. In other words, the first information processing apparatus 10 can achieve the functions necessary for control communication using a path different from the communication path of control communication on the network in the cloud.

By not transmitting the first control communication information of the first communication method received from the control communication unit to the outside, the first information processing apparatus 10 can reduce the communication volume on the network in the cloud.

By converting the communication method between the second communication method and the first communication method for the second control communication information of the first communication method, the first information processing apparatus 10 can transmit and receive the second control communication information via the second communication method on a network in the cloud in which the first communication method is not supported.

By transmitting and receiving second control communication information between the control communication unit and the outside along the communication path of control communication on the network in the cloud, the first information processing apparatus 10 can exchange the second control communication information with an external node.

By transmitting and receiving the third control communication information of the second communication method along the communication path of the control communication in the network on the cloud, the first information processing apparatus 10 can achieve normal control communication according to the control communication protocol.

By generating network setting information based on the acquired first control communication information and setting the network setting information in the network setting manager, the first information processing apparatus 10 can manage routing information from the first control communication information generated in the adaptor.

Figure 5:
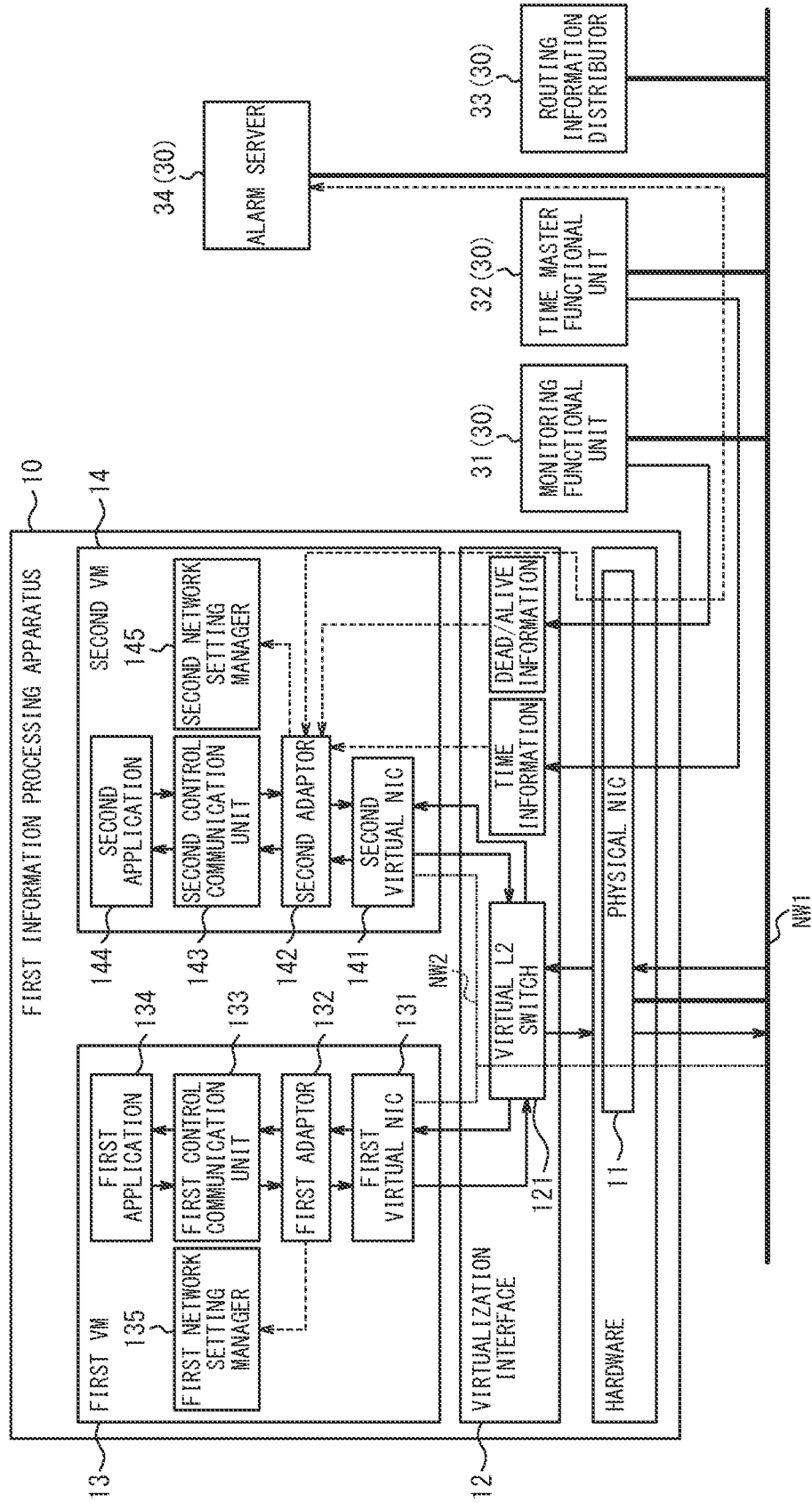
FIG. 5 is a block diagram illustrating a variation of the control communication system of FIG. 1.

FIG. 5 is a block diagram illustrating a variation of the control communication system 1 of FIG. 1. FIG. 5 illustrates only a portion of the control communication system 1 of FIG. 1, including the first information processing apparatus 10 and the network environment manager 30.

In the above embodiment, the adaptor of the first information processing apparatus 10 has been described as transmitting and receiving the second control communication information between the control communication unit and the outside along the communication path of control communication on the network in the cloud via the physical NIC 11 and the virtual L2 switch 121, but this configuration is not limiting. The adaptor may transmit and receive the second control communication information between the control communication unit and the outside along a path different from the communication path of the control communication on the network in the cloud.

For example, the network environment manager 30 may further include an alarm server 34. The adaptor may be communicably connected directly to the alarm server 34. The adaptor may transmit multicast alarm information acquired from the control communication unit to the alarm server 34 after conversion to a communication method according to the communication protocol for communication with the alarm server 34. The adaptor may output alarm information, received from the alarm server 34 according to the communication protocol for communication with the alarm server 34, to the control communication unit after conversion to multicast.

In the above embodiment, the control communication unit and the adaptor have been described as functioning on a virtual machine constructed by the virtualization interface 12, but this configuration is not limiting. The first information processing apparatus 10 need not include the virtualization interface 12. The control communication unit and the adaptor may function on the first information processing apparatus 10 as a physical server.

In the above embodiment, the adaptor has been described as generating the first control communication information using the information aggregated in the virtualization interface 12, but this configuration is not limiting. The adaptor may be communicably connected directly to the monitoring functional unit 31 and/or the time master functional unit 32. The adaptor may directly acquire the dead/alive information and/or the time information through external functions including the monitoring functional unit 31 and the time master functional unit 32.

In the above embodiment, the adaptor has been described as generating network setting information based on the acquired first control communication information and setting the network setting information in the network setting manager, but this configuration is not limiting. The first information processing apparatus 10 need not include the network setting manager.

In the above embodiment, an external time synchronization function such as the time master functional unit 32 has been described as being used to set the time of the virtualization interface 12, but this configuration is not limiting. An external time synchronization function such as the time master functional unit 32 may be used to set the time of the first information processing apparatus 10 as a physical sever used by the virtualization interface 12.

In the above embodiment, the adaptor has been described as acquiring the time information from the virtualization interface 12, but this configuration is not limiting. The adaptor may acquire the time information from the first VM 13 and/or the second VM 14.

In the above embodiment, the external monitoring functional unit 31 has been described as performing the dead/alive monitoring of all nodes, but this configuration is not limiting. The virtualization interface 12 of each physical server as the first information processing apparatus 10 may perform the dead/alive monitoring of all nodes.

(Second Information Processing Apparatus 20)

Figure 6:
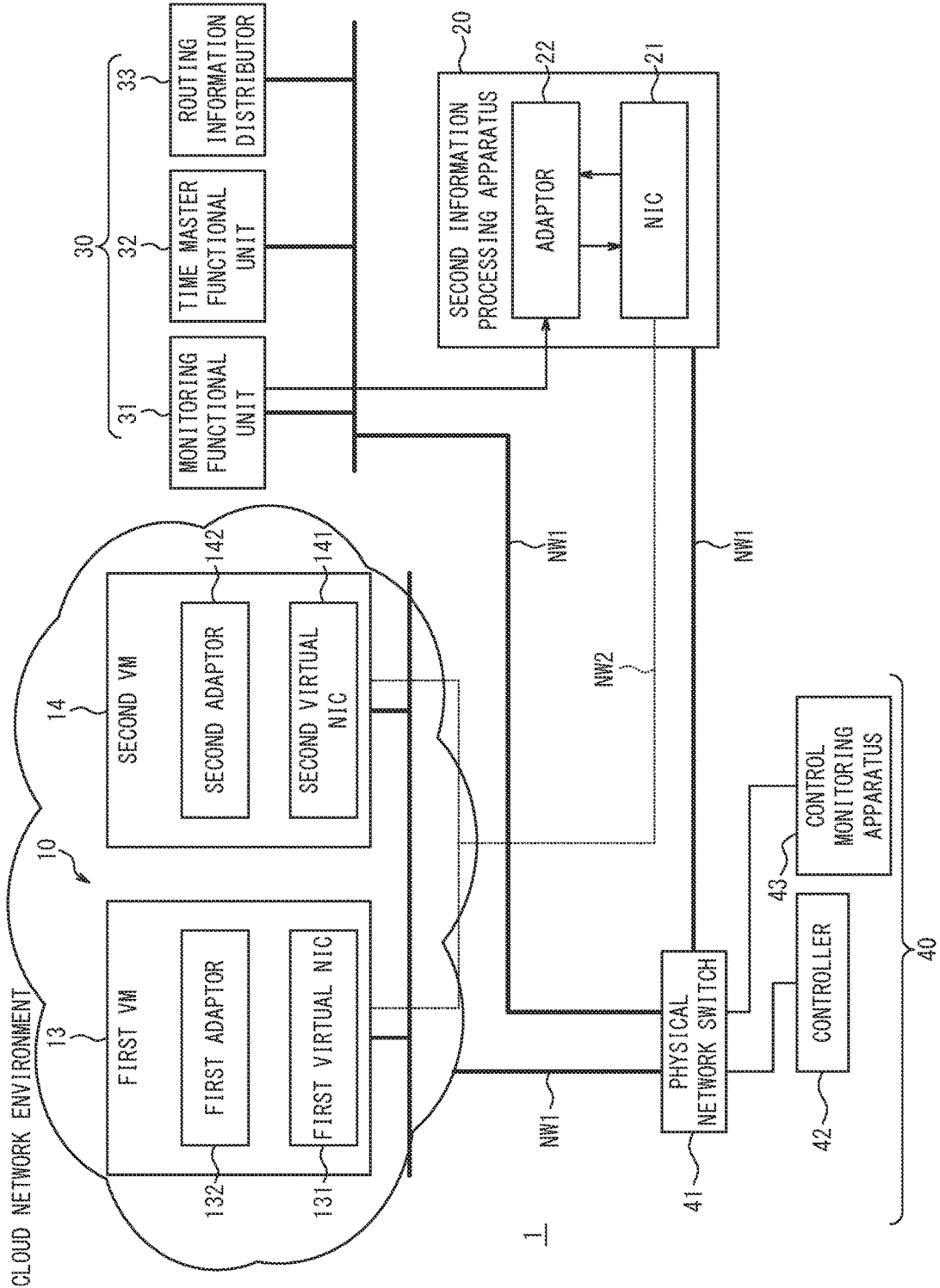
FIG. 6 is a block diagram corresponding to FIG. 1, which illustrates an example configuration of the control communication system.

The configuration and functions of the second information processing apparatus 20 are mainly described below with reference to FIG. 6. FIG. 6 is a block diagram corresponding to FIG. 1, which illustrates an example configuration of the control communication system 1. FIG. 6 illustrates the configuration of the second information processing apparatus 20 in more detail, focusing mainly on the configuration of the second information processing apparatus 20 while illustrating a more simplified form of the first information processing apparatus 10, including the first VM 13 and the second VM 14, in the cloud network environment of FIG. 1.

Consider the case in which the physical control network 40, which is the physical network, is connected to the cloud network environment including the first VM13 and the second VM 14. The control communication system 1 needs to transmit information to the physical control network 40 after restoring the multicast or broadcast communication method that was originally supposed to be used for transmission and reception as control communication on the cloud network environment side. Therefore, the control communication system 1 includes the second information processing apparatus 20. The second information processing apparatus 20 similarly performs the processes performed by the adaptor of the first information processing apparatus 10, such as generating the first control communication information from other information, and transmits the generated information to the physical control network 40 according to the control communication protocol.

The network in the cloud, including the first VM 13 and the second VM 14, and the second information processing apparatus 20 are communicably connected to each other by the virtual control network NW2, The second information processing apparatus 20 is communicably connected to the network in the cloud and the physical control network 40.

The second information processing apparatus 20 has an NIC 21 that includes a physical NIC as hardware. The second information processing apparatus 20 is communicably connected to the network NW1 via the NIC 21, The second information processing apparatus 20 is communicably connected to the virtual control network NW2 via the NIC 21. The second information processing apparatus 20 is communicably connected to the first VM 13 and the second VM 14 in the cloud network environment via the NIC 21 and the virtual control network NW2.

The second information processing apparatus 20 includes an adaptor 22. The adaptor 22 functions on the second information processing apparatus 20. Information transmitted from the physical control network 40 via the physical network switch 41 on the network NW1 is received by the adaptor 22 via the NIC 21, Information outputted from the adaptor 22 is transmitted to the virtual control network NW2 via the NIC 21. Information transmitted from the network in the cloud on the virtual control network NW2 is received by the adaptor 22 via the NIC 21. Information outputted from the adaptor 22 is transmitted to the physical control network 40 via the NIC 21 and the network NW1.

The adaptor 22 generates the first control communication information from among the control communication information required for control communication based on the control communication protocol, the adaptor 22 generating the first control communication information with use of information, from the network in the cloud, acquired along a path different from the communication path of the control communication. The first control communication information is information of the first communication method for one-to-many communication, which is not supported by the network in the cloud that includes the first VM 13 and the second VM 14. The adaptor 22 transmits the generated first control communication information to the physical control network 40.

The adaptor 22 generates the first control communication information using information aggregated in the network environment manager 30.

For example, for the diagnostic information, the dead/alive monitoring function of the monitoring functional unit 31 is used. The monitoring functional unit 31 performs dead/alive monitoring of all nodes. The adaptor 22 of the second information processing apparatus 20 acquires the dead/alive information from the monitoring functional unit 31. The adaptor 22 converts the acquired dead/alive information into diagnostic information as dead/alive monitoring information from each node in the control communication and transmits the result to the physical control network 40. In this way, the adaptor 22 generates multicast diagnostic information using the dead/alive information acquired from the network environment manager 30 not along the communication path of control communication, but rather along a path different from that communication path.

For the second control communication information of the first communication method, the adaptor 22 converts the communication method between the second communication method for one-to-one communication and the first communication method. The adaptor 22 transmits and receives the second control communication information between the network in the cloud and the physical control network 40 along the communication path of the control communication.

For example, the adaptor 22 converts the protocol of unicast alarm information, received from the first VM 13 and the second VM 14 in the cloud via the virtual control network NW2, to multicast. The adaptor 22 de-encapsulates the encapsulation performed by the adaptor of the first information processing apparatus 10 and transmits the alarm information to the physical control network 40 as multicast information.

For example, the adaptor 22 converts the protocol of multicast alarm information, received from the physical control network 40 via the network NW1, to unicast. The adaptor 22 adds information indicating broadcast communication to the multicast communication frame corresponding to the alarm information received from the physical control network 40 and encapsulates the data into unicast for all nodes. The adaptor 22 transmits the encapsulated unicast alarm information to the first VM 13 and the second VM 14 via the virtual control network NW2.

With reference to FIGS. 7 and 8, the flow of processing executed by the adaptor 22 of the second information processing apparatus 20 in FIG. 6 is now mainly described. FIG. 7 is a flowchart for explaining a first example of the second information processing method executed by the second information processing apparatus 20 in FIG. 6.

In step S401, the adaptor 22 of the second information processing apparatus 20 acquires information from the network in the cloud along a path different from the communication path of the control communication.

In step S402, using the information acquired in step S401, the adaptor 22 generates the first control communication information of the first communication method for one-to-many communication from among the control communication information required for control communication based on the control communication protocol.

In step S403, the adaptor 22 transmits the first control communication information generated in step S402 to the physical control network 40.

FIG. 8 is a flowchart for explaining a second example of the second information processing method executed by the second information processing apparatus 20 in FIG. 6.

In step S501, the adaptor 22 of the second information processing apparatus 20 acquires the second control communication information. For example, the adaptor 22 receives multicast alarm information from the physical control network 40 via the network NW1. For example, the adaptor 22 receives unicast alarm information from the first VM 13 and the second VM 14 on the network in the cloud via the virtual control network NW2.

In step S502, for the second control communication information acquired in step S501, the adaptor 22 converts the communication method between the first communication method and the second communication method. For example, the adaptor 22 converts multicast alarm information, received from the physical control network 40, to unicast. For example, the adaptor 22 converts unicast alarm information received from the network in the cloud to multicast.

In step S503, the adaptor 22 outputs the second control communication information for which the communication method was converted in step S502. For example, the adaptor 22 transmits the alarm information converted to unicast to the first VM 13 and the second VM 14 on the network in the cloud. For example, the adaptor 22 transmits the alarm information converted to multicast to the physical control network 40.

According to the second information processing apparatus 20, the second information processing method executed by the second information processing apparatus 20, and the control communication system 1 in the above embodiment, control communication can be achieved on a network in the cloud. The second information processing apparatus 20 generates the first control communication information of the first communication method using information from the network in the cloud acquired along a path different from the communication path of the control communication and transmits the first control communication information to the physical control network 40. Therefore, the second information processing apparatus 20 can achieve the functions necessary for control communication between the network in the cloud and the physical control network 40 without having the first control communication information of the first communication method, which includes multicast, broadcast, and the like that are not supported by the network, go through the communication path of control communication on the network. The second information processing apparatus 20 enables communication by the control communication protocol even between the physical control network 40 and the network in the cloud, in which multicast and broadcast cannot be used.

By converting the communication method between the second communication method and the first communication method for the second control communication information of the first communication method, the second information processing apparatus 20 can transmit and receive the second control communication information via the second communication method between the physical control network 40 and the network in the cloud, in which the first communication method is not supported.

The second information processing apparatus 20 transmits and receives the second control communication information between the network in the cloud and the physical control network 40 along the communication path of control communication on the network in the cloud. This enables the control communication system 1 to exchange the second control communication information between the network and the physical control network 40 via the second information processing apparatus 20.

By including the physical network switch 41 as an apparatus different from the second information processing apparatus 20, the control communication system 1 can use an apparatus specialized for switch functions as the physical network switch 41.

By the network in the cloud and the second information processing apparatus 20 being connected to each other by the virtual control network NW2, the second information processing apparatus 20 can transmit and receive information such as the second control communication information to and from the network in the cloud via the virtual control network NW2.

In the above embodiment, the adaptor 22 of the second information processing apparatus 20 functions on the second information processing apparatus 20 as a physical server, but this configuration is not limiting. The second information processing apparatus 20 may include a virtualization interface, like the first information processing apparatus 10. The adaptor 22 may function on a virtual machine constructed by such a virtualization interface.

By including such a virtualization interface, the second information processing apparatus 20 can provide functions related to control communication on a virtual machine constructed by the virtualization interface. The second information processing apparatus 20 can also construct and activate a plurality of virtual machines on a single physical server.

In the above embodiment, the second information processing apparatus 20 has been described as being arranged in the control communication system 1 as an apparatus different from the physical network switch 41, but this configuration is not limiting. The second information processing apparatus 20 may be an apparatus integrally configured with the physical network switch 41.

In this case, the second information processing apparatus 20 may be a router having the various functions described above for the adaptor 22 and the switching function of the physical network switch 41.

In other words, the second information processing apparatus 20 may include, in addition to the adaptor 22, a relay that functions as a network switch connecting the network in the cloud and the physical control network 40. The adaptor 22 and the relay may function on the second information processing apparatus 20 as a physical server or on a virtual machine constructed by the above-described virtualization interface.

This enables the second information processing apparatus 20 to provide the various functions of the adaptor 22 and switching functions together on a single apparatus. The number of apparatuses configuring the control communication system 1 can be reduced.

In the above embodiment, the control communication system 1 has been described as including the physical network switch 41, but this configuration is not limiting. Instead of the physical network switch 41, the control communication system 1 may include a virtual network switch having the same functions as the physical network switch 41.

In the above embodiment, the physical network switch 41 has been described as being included in the physical control network 40, but this configuration is not limiting. The physical network switch 41 need not be included in the physical control network 40.

It will be clear to a person of ordinary skill in the art that the present disclosure may be implemented in certain ways other than the above embodiments without departing from the spirit or essential features thereof. Accordingly, the above explanation merely provides examples that are in no way limiting. The scope of the present disclosure is to be defined by the appended claims, not by the above explanation. Among all changes, various changes that are within the range of equivalents are considered to be included therein.

For example, the arrangement, orientation, number, and the like of the above-described components are not limited to the above explanation or the drawings. The arrangement, orientation, number, and the like of each component may be selected freely as long as the functions of the component can be achieved.

For example, the functions and the like included in each of the steps in the above-described first information processing method may be rearranged in any logically consistent way. A plurality of steps may be combined into one, and individual steps may be divided.

For example, the functions and the like included in each of the steps in the above-described second information processing method may be rearranged in any logically consistent way. A plurality of steps may be combined into one, and individual steps may be divided.

The first information processing apparatus 10, the second information processing apparatus 20, the control communication system 1, and the information processing method have mainly been described above, but the present disclosure can also be implemented as a program to be executed by a processor included in the first information processing apparatus 10 or as storage medium on which a program is recorded. The present disclosure can also be implemented as a program to be executed by a processor included in the second information processing apparatus 20 or as a storage medium on which a program is recorded. Such embodiments are also to be understood as falling within the scope of the present disclosure.

The invention claimed is:

1. An information processing apparatus under a network environment in a cloud in a control communication system for control communication with physical equipment comprising:
    a control communication unit configured to transmit and receive control communication information according to a control communication protocol; and
    an adaptor configured to generate first control communication information of a first communication method for one-to-many communication from among the control communication information required for the control communication based on the control communication protocol, the adaptor generating the first control communication information with use of information acquired from a network environment manager not included in a network in the cloud along a path different from a communication path, where the first communication method is not supported, of the control communication on the network in the cloud, and to output the first control communication information to the control communication unit.

2. The information processing apparatus according to claim 1, further comprising:
    a virtualization interface, wherein
    the control communication unit and the adaptor function on a virtual machine constructed by the virtualization interface.

3. The information processing apparatus according to claim 2, wherein the adaptor is configured to generate the first control communication information with use of the information aggregated in the virtualization interface from the network environment manager.

4. The information processing apparatus according to claim 1, wherein the adaptor is configured to refrain from transmitting the first control communication information of the first communication method acquired from the control communication unit to an outside.

5. The information processing apparatus according to claim 1, wherein for second control communication information of the first communication method, the adaptor is configured to convert a communication method between a second communication method for one-to-one communication and the first communication method.

6. The information processing apparatus according to claim 5, wherein the adaptor is configured to transmit and receive the second control communication information between the control communication unit and an outside along the communication path or the path.

7. The information processing apparatus according to claim 1, wherein the adaptor is configured to transmit and receive, along the communication path, third control communication information of a second communication method for one-to-one communication.

8. The information processing apparatus according to claim 1, further comprising:
    a network setting manager, wherein
    the adaptor is configured to generate network setting information based on the acquired first control communication information and set the network setting information in the network setting manager.

9. An information processing method to be executed by an information processing apparatus under a network environment in a cloud in a control communication system for control communication with physical equipment, the information processing method comprising:

generating first control communication information of a first communication method for one-to-many communication from among control communication information required for the control communication based on a control communication protocol, the first control communication information being generated with use of information acquired from a network environment manager not included in a network in the cloud along a path different from a communication path, where the first communication method is not supported, of the control communication on the network in the cloud; and transmitting and receiving the control communication information according to the control communication protocol.

10. A non-transitory computer-readable medium storing a program configured to cause an information processing apparatus under a network environment in a cloud in a control communication system for control communication with physical equipment to execute operations comprising:

generating first control communication information of a first communication method for one-to-many communication from among control communication information required for the control communication based on a control communication protocol, the first control communication information being generated with use of information acquired from a network environment manager not included in a network in the cloud along a path different from a communication path, where the first communication method is not supported, of the control communication on the network in the cloud; and transmitting and receiving the control communication information according to the control communication protocol.

* * * * *